United States Patent
Payne et al.

(10) Patent No.: US 12,459,354 B2
(45) Date of Patent: Nov. 4, 2025

(54) DRIVE SYSTEMS AND METHODS FOR AN AGRICULTURAL APPLICATOR

(71) Applicant: CNH Industrial America LLC, New Holland, PA (US)

(72) Inventors: Daniel Payne, Westmont, IL (US); Jeremy A. Amundson, Willmar, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/933,269

(22) Filed: Oct. 31, 2024

(65) Prior Publication Data

US 2025/0145000 A1    May 8, 2025

Related U.S. Application Data

(60) Provisional application No. 63/595,509, filed on Nov. 2, 2023.

(51) Int. Cl.
*B60K 7/00* (2006.01)
*B60K 17/356* (2006.01)
*B60K 23/08* (2006.01)

(52) U.S. Cl.
CPC ............ *B60K 23/08* (2013.01); *B60K 7/0015* (2013.01); *B60K 17/356* (2013.01); *B60K 2023/0866* (2013.01)

(58) Field of Classification Search
CPC .... B60K 7/0015; B60K 17/356; B60K 23/08; B60K 2023/0866
See application file for complete search history.

(56) References Cited

U.S. PATENT DOCUMENTS

| | | | | |
|---|---|---|---|---|
| 4,373,605 | A * | 2/1983 | Sheppard, Sr. | B60K 17/10 60/431 |
| 7,632,179 | B2 * | 12/2009 | Brome | A01D 41/127 460/1 |
| 11,304,370 | B2 * | 4/2022 | Trowbridge | A01D 75/187 |
| 2014/0123636 | A1 * | 5/2014 | Prigent | B60K 7/0015 60/328 |
| 2014/0219848 | A1 * | 8/2014 | Rabhi | F04B 11/0016 418/24 |
| 2020/0232556 | A1 * | 7/2020 | Didierjean | F16H 59/44 |

* cited by examiner

*Primary Examiner* — Edwin A Young
(74) *Attorney, Agent, or Firm* — Dority & Manning, P.A.

(57) ABSTRACT

A drive system for an agricultural vehicle can include a power plant operably coupled with a chassis and a propulsion pump unit. A sensor can be configured to provide data indicative of one or more operational conditions. A computing system can be operably coupled with the sensor, a first propulsion motor, a second propulsion motor, a third propulsion motor, and a fourth propulsion motor. The computing system can be configured to detect one or more operational conditions based on data from the sensor, and assign each of the propulsion motors to a first set or a second set when one or more defined operational conditions are detected based on one or more assignment parameters, and control a flow rate of the first set to operate at a first flow rate and the second set to operate at a second flow rate.

20 Claims, 5 Drawing Sheets

DRIVE SYSTEMS AND METHODS FOR AN AGRICULTURAL APPLICATOR

CROSS-REFERENCE TO RELATED APPLICATION

This application claims priority to U.S. Provisional Application No. 63/595,509, entitled "DRIVE SYSTEMS AND METHODS FOR AN AGRICULTURAL APPLICATOR," filed on Nov. 2, 2023. The entire contents of the above-referenced application are hereby incorporated by reference in its entirety for all purposes.

FIELD OF THE INVENTION

The present subject matter relates generally to vehicles that may include a hydraulic propulsion pump that is configured to generate power through a flow of hydraulic fluid to provide motive force for the vehicle.

BACKGROUND OF THE INVENTION

Various types of vehicles utilize applicators (e.g., vehicles, floaters, etc.) to deliver an agricultural product to the ground surface of a field. The agricultural product may be in the form of a solution or mixture, with a carrier (such as water) being mixed with one or more active ingredients (such as an herbicide, agricultural product, fungicide, a pesticide, or another product).

The applicators may be pulled as an implement or self-propelled and can include a tank, a pump, a boom assembly, and a plurality of nozzles carried by the boom assembly at spaced locations. The boom assembly can include a pair of boom arms, with each boom arm extending to either side of the applicator when in an unfolded state. Each boom arm may include multiple boom sections, each with a number of spray nozzles (also sometimes referred to as spray tips).

The spray nozzles on the boom assembly disperse the agricultural product carried by the applicator onto a field. During a spray operation, however, an engine (or other power plant) may operate various pumps, which can affect the efficiency of the vehicle. Accordingly, an improved system and method for increasing the efficiency of the vehicle would be welcomed in the technology.

BRIEF DESCRIPTION OF THE INVENTION

Aspects and advantages of the technology will be set forth in part in the following description, or may be obvious from the description, or may be learned through practice of the technology.

In some aspects, the present subject matter is directed to a drive system for an agricultural vehicle. The drive system includes a chassis, a power plant operably coupled with the chassis, and a propulsion pump unit connected to the power plant and configured to generate power through a flow of hydraulic fluid. A first propulsion motor is fluidly coupled with the propulsion pump unit and is configured to drive a first tractive force to a first wheel assembly. The first wheel assembly is positioned fore of a latitudinal centerline of the chassis. A second propulsion motor is fluidly coupled with the propulsion pump unit and is configured to drive a second tractive force to a second wheel assembly. The second wheel assembly is positioned aft of the latitudinal centerline of the chassis. A sensor is configured to detect data indicative of one or more defined operational conditions. A computing system is operably coupled with the sensor, the first propulsion motor, and the second propulsion motor. The computing system includes a processor and associated memory, the memory storing instructions that, when implemented by the processor, configure the computing system to detect the one or more defined operational conditions based on the data from the sensor, assign the first propulsion motor and the second propulsion motor to a first set or a second set when the one or more defined operational conditions are detected, and control a flow rate of the first set to operate at a first flow rate and the second set to operate at a second flow rate. The first flow rate is less than the second flow rate.

In some aspects, the present subject matter is directed to a method for operating a drive system of an agricultural vehicle. The method includes detecting, with a computing system, one or more defined operational conditions from one or more sensors of a vehicle including a chassis driven by a propulsion pump unit. The method also includes assigning a first propulsion motor and a second propulsion motor to a first set or a second set when the one or more defined operational conditions are detected. Lastly, the method includes controlling a flow rate of the first set to operate at a first flow rate and the second set to operate at a second flow rate, the first flow rate less than a second flow rate.

In some aspects, the present subject matter is directed to a drive system for an agricultural vehicle. The drive system can include a chassis, a power plant operably coupled with the chassis, and a propulsion pump unit connected to the power plant and configured to generate power through a flow of hydraulic fluid. A first propulsion motor is fluidly coupled with the propulsion pump unit and is configured to drive a first tractive force to a first wheel assembly. The first wheel assembly is positioned fore of a latitudinal centerline of the chassis. A second propulsion motor is fluidly coupled with the propulsion pump unit and is configured to drive a second tractive force to a second wheel assembly. The second wheel assembly is positioned aft of the latitudinal centerline of the chassis. A third propulsion motor is fluidly coupled with the propulsion pump unit and is configured to drive a third tractive force to a third wheel assembly. The third wheel assembly is positioned aft of the latitudinal centerline of the chassis and on a common side of a longitudinal centerline of the chassis as the first wheel assembly. A fourth propulsion motor is fluidly coupled with the propulsion pump unit and is configured to drive a fourth tractive force to a fourth wheel assembly. The fourth wheel assembly is positioned fore of the latitudinal centerline of the chassis and on a common side of the longitudinal centerline of the chassis as the second wheel assembly. A sensor is configured to provide data indicative of one or more operational conditions. A computing system is operably coupled with the sensor, the first propulsion motor, the second propulsion motor, the third propulsion motor, and the fourth propulsion motor. The computing system includes a processor and associated memory, the memory storing instructions that, when implemented by the processor, configure the computing system to detect one or more operational conditions based on data from the sensor, assign the first propulsion motor, the second propulsion motor, the third propulsion motor, and the fourth propulsion motor to a first set or a second set when one or more defined operational conditions are detected based on one or more assignment parameters, and control a flow rate of the first set to operate at a first flow rate and the second set to operate at a second flow rate. The first flow rate is less than the second flow rate.

These and other features, aspects, and advantages of the present technology will become better understood with reference to the following description and appended claims.

The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
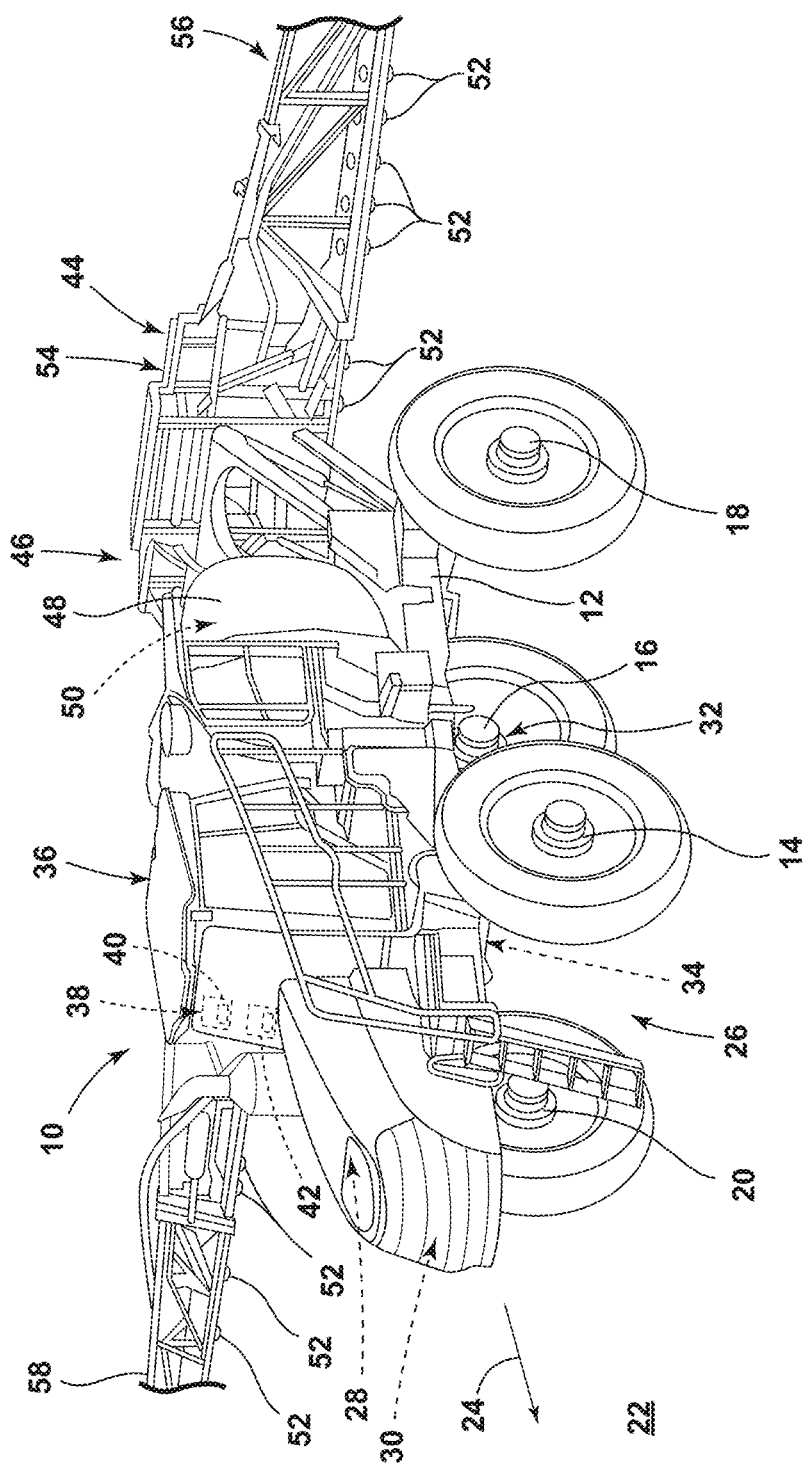
FIG. 1 illustrates a perspective view of an agricultural vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the drive system for an agricultural vehicle provided herein can include a power plant operably coupled with a chassis and a propulsion pump unit. A sensor can be configured to detect data indicative of one or more defined operational conditions. A computing system can be operably coupled with the sensor, a first propulsion motor, a second propulsion motor, a third propulsion motor, and a fourth propulsion motor. The computing system can be configured to detect one or more defined operational conditions based on data from the sensor, and assign each of the propulsion motors to a first set or a second set when one or more defined operational conditions are detected based on one or more assignment parameters, and control a flow rate of the first set to operate at a first flow rate and second set to operate at a second flow rate.

In operation, the first flow rate and the second flow rate may be a common flow rate when one of the one or more defined operational conditions are detected. Once the one or more defined operational conditions are detected, each (or any) of the propulsion motors is assigned to the first set or the second set. In turn, the computing system can be configured to control a flow rate of the first set to operate at a first flow rate and the second set to operate at a second flow rate. In such instances, the first set of one or more propulsion motors operates at a first lower flow rate and/or a first lower pressure relative to the second set, and the second set of one or more propulsion motors remains at a higher flow rate and/or a higher pressure relative to the first set as driving all four wheels may not be needed for traction since the available torque at each wheel is far below the traction available due to power limitations from the engine. For example, the first flow rate can be set to equal to zero, essentially idling them, while the remaining two propulsion motors work at a higher flow rate and/or a higher pressure, which may increase the overall system efficiency.

Figure 2:
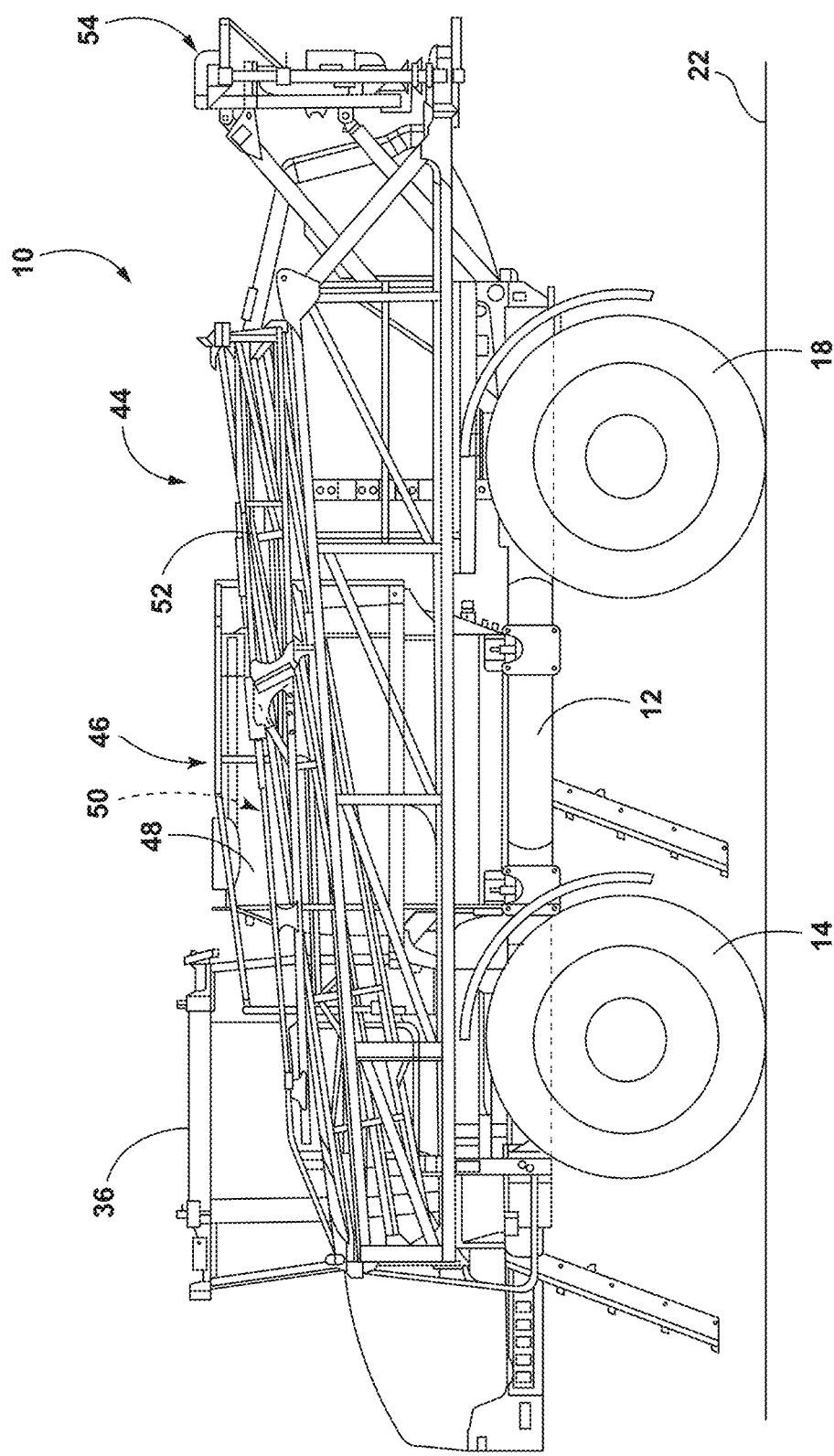
FIG. 2 illustrates a side view of the vehicle in accordance with aspects of the present subject matter.

Referring now to FIGS. 1 and 2, a vehicle 10 is generally illustrated as a self-propelled agricultural applicator. However, in alternate embodiments, the vehicle 10 may be configured as any other suitable type of vehicle 10 configured to perform agricultural application operations, such as a tractor or other vehicle configured to haul or tow an application implement.

In various embodiments, the vehicle 10 may include a chassis 12 configured to support or couple to a plurality of components. For example, a first wheel assembly 14, a second wheel assembly 16, a third wheel assembly 18, and a fourth wheel assembly 20 may be respectively coupled to the chassis 12. The wheel assemblies 14, 16, 18, 20 may be configured to support the vehicle 10 relative to a field 22 and move the vehicle 10 in a direction of travel (e.g., as indicated by arrow 24 in FIG. 1) across the field 22. In this regard, the vehicle 10 may include a drive system 26 that includes a power plant 28, such as an engine, a motor, or a hybrid engine-motor combination, a gearbox 30 configured to transmit power from the power plant 28 to the wheels 14, 16, and/or a brake system 32 via a hydrostatic propulsion pump unit 34.

The chassis 12 may also support a cab 36, or any other form of user's station, permitting the user to control the operation of the vehicle 10. For instance, as shown in FIG. 1, the vehicle 10 may include a user interface 38 having a display 40 for providing messages and/or alerts to the user and/or for allowing the user to interface with the vehicle's computing system through one or more user input devices 42 (e.g., levers, pedals, control panels, buttons, and/or the like), which may be used to alter an operational condition of the vehicle.

The chassis 12 may also support a boom assembly 44 mounted to the chassis 12. In addition, the chassis 12 may support a product application system 46 that includes one or more tanks 48, such as a rinse tank and/or a product tank. The product tank is generally configured to store or hold an agricultural product 50, such as a pesticide, a fungicide, a rodenticide, a nutrient, and/or the like. The agricultural product 50 is conveyed from the product tank through plumbing components, such as interconnected pieces of tubing, for release onto the underlying field 22 (e.g., plants and/or soil) through one or more nozzle assemblies 52 mounted on the boom assembly 44.

As shown in FIGS. 1 and 2, the boom assembly 44 can include a frame 54 that supports first and second boom arms 56, 58, which may be orientated in a cantilevered nature. The first and second boom arms 56, 58 are generally movable between an operative or unfolded position (FIG. 1) and an inoperative or folded position (FIG. 2). When distributing the product, the first and/or second boom arm 56, 58 extends laterally outward from the vehicle 10 to cover swaths of the underlying field 22, as illustrated in FIG. 1. However, to facilitate transport, each boom arm 56, 58 of the boom assembly 44 may be independently folded forwardly or rearwardly into the inoperative position, thereby reducing the overall width of the vehicle 10, or in some examples, the overall width of a towable implement when the applicator is configured to be towed behind the vehicle 10.

It will be appreciated that the configuration of the agricultural vehicle 10 described above and shown in FIGS. 1 and 2 are provided only to place the present subject matter in an example field of use. Thus, it will be appreciated that the present subject matter may be readily adaptable to any manner of machine configuration, including any suitable vehicle configuration and/or implement configuration.

Figure 3:
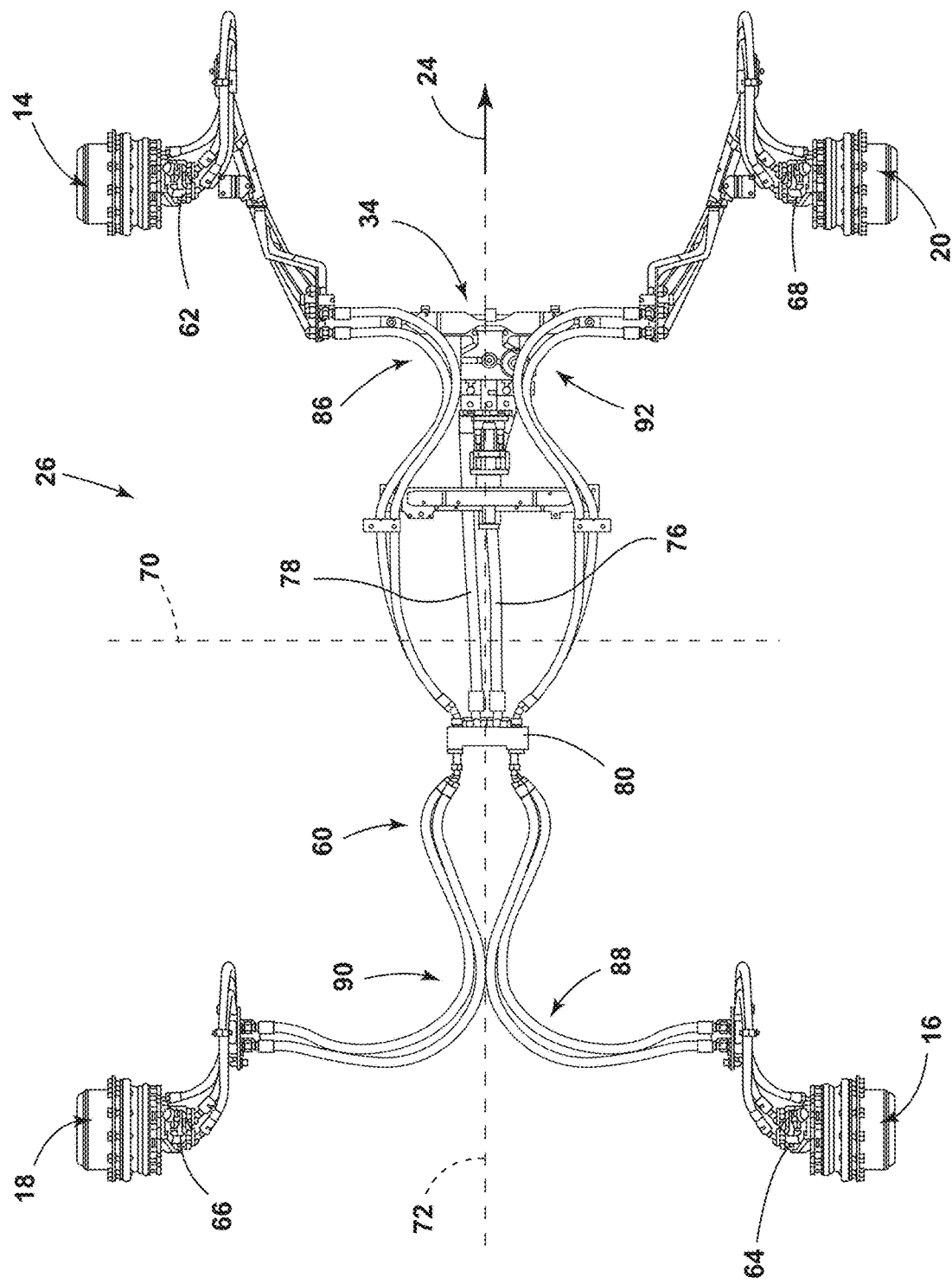
FIG. 3 illustrates a top view of components of a drive system for an agricultural vehicle in accordance with aspects of the present subject matter.
Figure 4:
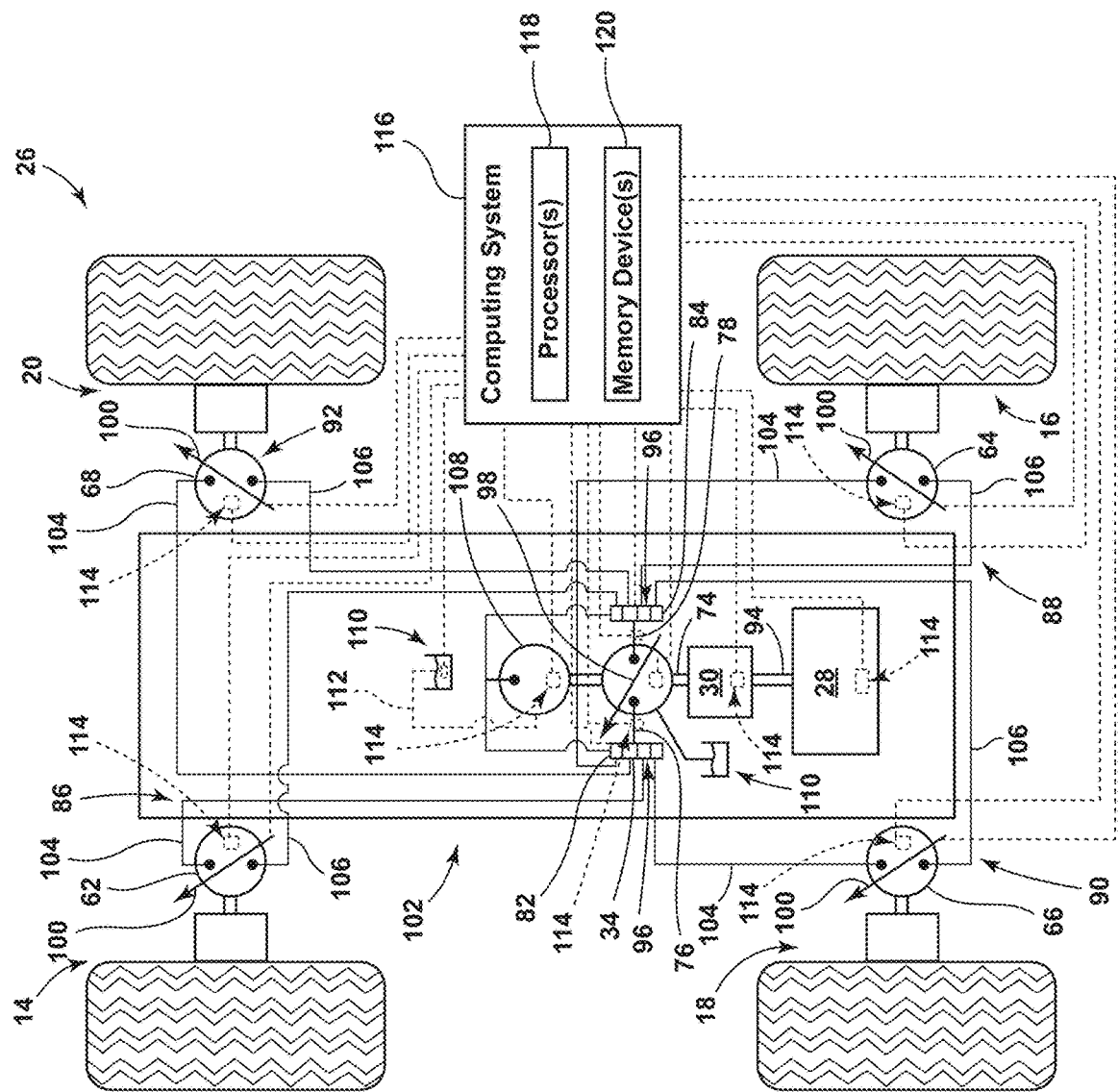
FIG. 4 illustrates a schematic diagram of components of a drive system for an agricultural vehicle in accordance with aspects of the present subject matter.

Referring now to FIGS. 3 and 4, the drive system 26 can include a hose routing assembly 60 for a series of ground drive hydrostatic hoses that are connected in fluid communication to four propulsion motors 62, 64, 66, 68. The four propulsion motors 62, 64, 66, 68 are each respectively operatively connected to independently drive a respective wheel assembly 14, 16, 18, 20, which, in turn, can independently drive the wheels of the vehicle 10. For example, the drive system 26 can include the first propulsion motor 62 fluidly coupled with the propulsion pump unit 34 and configured to drive a first tractive force to the first wheel assembly 14. The first wheel assembly 14 can be positioned fore of a latitudinal centerline 70 of the chassis 12. The drive system 26 can also include the second propulsion motor 64 fluidly coupled with the propulsion pump unit 34 and configured to drive a second tractive force to the second wheel assembly 16. The second wheel assembly 16 can be positioned aft of the latitudinal centerline 70 of the chassis 12. The drive system 26 can further include the third propulsion motor 66 fluidly coupled with the propulsion pump unit 34 and configured to drive a third tractive force to the third wheel assembly 18. The third wheel assembly 18 can be positioned aft of the latitudinal centerline 70 of the chassis 12 and on a common side of a longitudinal centerline 72 of the chassis 12 as the first wheel assembly 14. In addition, the drive system 26 can include the fourth propulsion motor 68 fluidly coupled with the propulsion pump unit 34 and configured to drive a fourth tractive force to the fourth wheel assembly 20. The fourth wheel assembly 20 can be positioned fore of the latitudinal centerline 70 of the chassis 12 and on the common side of the longitudinal centerline 72 of the chassis 12 as the second wheel assembly 16.

In some examples, the four variable-displacement hydraulic propulsion motors 62, 64, 66, 68 can be connected in fluid communication to a common hydrostatic propulsion pump unit 34 (or various pump units 34) and operably coupled, such as by a drive shaft, a flex plate 74, and/or in any other manner, with the power plant to be driven by the power plant 28 (FIG. 1) of the vehicle 10. The pump unit 34 can be connected by a forward supply hose 76 and a reverse supply hose 78 to a common manifold block 80, as shown in FIG. 3. Alternatively, as shown in FIG. 4, the pump unit 34 can be connected by a forward supply hose 76 to a first manifold block 82 and a reverse supply hose 78 to a second manifold block 84. In some examples, the drive system 26 can include a plurality of valves 96, which may be within the manifold block(s) 80, 82, 84 or exterior to the manifold block(s) 80, 82, 84, that are configured to allow flow in a first position and restrict flow in a second position.

In various examples, the ground drive hose routing assembly 60 can include four pairs of hydraulic hose arrangements 86, 88, 90, 92, each consisting of a supply hose and a return hose that run substantially parallel to one another to provide fluid communication between the manifold block(s) 80, 82, 84 on the chassis 12 and one of the propulsion motors 62, 64, 66, 68. The function of a particular hose in each of the four pairs of hydraulic hose arrangements 86, 88, 90, 92 can alternate between being a supply hose or a return hose, depending upon whether the vehicle 10 is being driven forward or in reverse by the hydrostatic propulsion pump unit 34.

Referring now to FIG. 4, a schematic view of the drive system 26 is illustrated in accordance with aspects of the present disclosure. As shown, the drive system 26 may include a propulsion pump unit 34, with the power plant 28 of the agricultural vehicle 10 being configured to drive the propulsion pump unit 34. For example, the power plant 28 may have an output shaft 94 configured to drive an engine gearbox 30. The engine gearbox 30 may, in turn, be configured to drive the propulsion pump unit 34. Each of the four propulsion motors 62, 64, 66, 68 may be fluidly connected with the propulsion pump unit 34 through a closed hydraulic loop 102 of the drive system 26 such that the four propulsion motors 62, 64, 66, 68 may be configured to be fluidly driven by the propulsion pump unit 34. The propulsion pump unit 34 may include a plurality of pistons and/or a variable angle pump swash plate (represented by diagonal arrow 98 in FIG. 4) that is configured to adjust the pump displacement for the propulsion pump unit 34. Similarly, the four propulsion motors 62, 64, 66, 68 may each include a plurality of pistons and/or a variable angle motor swash plate (represented by diagonal arrows 98 in FIG. 2) configured to adjust the motor displacement for the four propulsion motors 62, 64, 66, 68.

The closed hydraulic loop 102 may fluidly connect the propulsion pump unit 34 with the four propulsion motors 62, 64, 66, 68. For example, the closed hydraulic loop 102 may include a first line 104 and a second line 106. When driving the agricultural vehicle 10 in a forward direction, the propulsion pump unit 34 may generate a high-pressure flow of hydraulic fluid into the first line 104. In turn, the hydraulic fluid may flow through the first line 104 and drive any of the four propulsion motors 62, 64, 66, 68 to move the vehicle 10 forward. The hydraulic fluid flows through any of the four propulsion motors 62, 64, 66, 68, through the second line 106 and returns to a low-pressure supply side of the propulsion pump unit 34. When driving in reverse, the propulsion pump unit 34 outputs a high flow rate and/or a high pressure to the second line 106, and the hydraulic fluid returns to the propulsion pump unit 34 through the first line 104. In either direction, the propulsion pump unit 34 drives one or more of the four propulsion motors 62, 64, 66, 68 to drive the agricultural vehicle 10. To decelerate the agricultural vehicle 10, however, the system 26 may effectively operate in reverse and provide engine braking. The hydraulic propulsion motors 62, 64, 66, 68 may drive the propulsion pump unit 34 such that the kinetic energy of the agricultural vehicle 10 may be dissipated by the power plant 28 through engine braking. According to aspects of the present disclosure, the pump displacement of the propulsion pump unit 34 and/or the motor displacement of the four propulsion motors 62, 64, 66, 68 may be adjusted during deceleration to adjust the performance of the system 26 (e.g., engine braking and/or pressure relief flow).

The drive system 26 may also include a charge pump 108 configured to provide a charge flow of hydraulic fluid. For example, the charge pump 108 may be configured to pump hydraulic fluid from a reservoir 110 into a charge supply line 112 of the drive system 26 to replenish the closed hydraulic loop 102 when fluid is discharged through a control valve, pressure relief valves, and/or to compensate for any system leakage. The charge pump 108 may supply power through a flow of hydraulic fluid to the first line 104 and/or second line 106 through the charge supply line 112.

In some embodiments, the drive system 26 may include a plurality of sensors 114. For example, the drive system 26 may include at least one temperature sensor configured to measure the temperature of the hydraulic fluid in the closed hydraulic loop 102. For example, a temperature sensor may be fluidly connected with a drain port of the propulsion pump unit 34, (often referred to as "case drain"), that allows excess hydraulic fluid to flow to the reservoir 110. The fluid flowing out of the drain port of the propulsion pump unit 34 may be substantially at the same temperature as the hydraulic fluid in the closed hydraulic loop 102. Thus, the temperature sensor may be effectively configured to sense the temperature of the hydraulic fluid in the closed hydraulic loop 102. The drive system 26 may additionally or alternatively include at least one temperature sensor directly fluidly connected with the first line 104 or second line 106 to sense the temperature of the hydraulic fluid in the first line 104 or the second line 106. The drive system 26 may include temperature sensors having any other suitable location within the drive system 26 (e.g., connected with the charge supply line 112 or any other suitable line). Additionally, in some instances, a reservoir temperature sensor may be configured to sense the temperature of the hydraulic fluid in the reservoir 110.

In some embodiments, the drive system 26 may include at least one speed sensor configured to measure or sense rotation speeds of various components of the drive system 26. For example, an engine speed sensor 166 may be configured to sense an engine speed of an output shaft 94 of the power plant 28. A motor gearbox speed sensor 168 may be configured to sense a speed of the output shaft 152 of the hydraulic propulsion motors 62, 64, 66, 68 that drive the gearbox 30. This rotational speed may be used to determine the ground speed of the agricultural vehicle 10. For example, in some embodiments, the gearbox 30 may have multiple gears with associated gear ratios (e.g., a multiple range gearbox). A gearbox ratio sensor may be configured to sense the current gear of the gearbox 30 such that the ground speed of the agricultural vehicle 10 may be calculated based on the rotational speed of the input shaft of the motor gearbox 30 and the current gear ratio. Additionally, in some embodiments, the motor gearbox speed sensor 168 (or a separate sensor) may be configured to sense a rotational speed of an output shaft of the propulsion motors 62, 64, 66, 68. However, any other speed sensor may be used to determine a speed and/or direction of the vehicle 10.

In some instances, a location sensor may be configured to determine a position of the vehicle 10, which in turn may be used to determine a speed of the vehicle 10. In various examples, the location sensor may be configured as a satellite navigation positioning device (e.g. a GPS, a Galileo positioning system, a Global Navigation satellite system (GLONASS), a BeiDou Satellite Navigation and Positioning system, a dead reckoning device, and/or the like) to determine the location of the vehicle 10.

Additionally or alternatively, the sensor 114 may be configured as a ground speed sensor (such as a RADAR) and/or a transmission pickup sensor may be configured to generate data that is related to vehicle ground speed. For instance, the ground speed radar can emit radar signals at the ground over which the vehicle 10 is traveling, and, in turn, receive reflections of these emitted radar signals. The emitted and received signals may be used to calculate a chassis ground speed based upon the time elapsed between the emission of the radar signals and reception of the reflected signals. The transmission pickup sensor can measure a rotational velocity of the output shaft of the drive system 26 of the vehicle 10. In turn, a chassis ground speed corresponding to the rotational velocity of the output shaft can be calculated based upon the assumption that there is no slippage between the wheels of the vehicle 10 and the field 22 being traveled over. However, in some instances, a variance between the two sensors and/or a variance between any other two speed sensors may be indicative of a slippage event.

Referring further to FIG. 4, the components described herein may be operably coupled with a computing system 116. For example, each of the propulsion motors 62, 64, 66, 68, the pump unit 34, the charge pump 108, and the sensors 114 may be operably coupled with the computing system 116. In some cases, the computing system 116 may be configured to detect one or more defined operational conditions based on data from the sensor, assign the first propulsion motor 62 and the second propulsion motor 64 to a first set or a second set when one or more defined operational conditions are detected, and control a flow rate of the first set to operate at a first flow rate and the second set to operate at a second flow rate. In various examples, the operational conditions can include at least one of actuation of a user input device directing a change in operation of the vehicle, a speed of the chassis exceeding a defined ground speed, a traction control system engagement frequency exceeding a frequency threshold, one or more operational parameters being within a defined range, or detecting a wheel slip event.

In general, the computing system 116 may correspond to any suitable processor-based device, such as a computing device or any suitable combination of computing devices. Thus, in several examples, the computing system 116 may include one or more processor(s) 118 and the associated memory device(s) 120 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 120 of the computing system 116 may generally comprise memory element(s) including, but not limited to, computer-readable medium (e.g., random access memory (RAM)), computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 120 may generally be configured to store suitable computer-readable instructions that, when implemented by the processor(s) 118, configure the computing system 116 to perform various computer-implemented functions, such as any methods and/or other automated functions described herein. In addition, the computing system 116 may also include various other suitable components, such as a communications circuit or module, one or more input/output channels, a data/control bus, and/or the like.

It will be appreciated that the computing system 116 may correspond to an existing controller of the agricultural vehicle 10 or the computing system 116 may correspond to a separate processing device. For instance, in several examples, the computing system 116 may form all or part of a separate plug-in module that may be installed within the agricultural vehicle 10 to allow for the disclosed system 26 to be implemented without requiring additional software to be uploaded onto existing control devices of the vehicle 10.

In some embodiments, the computing system 116 may be configured to automatically control a pump displacement of the propulsion pump unit 34 and/or a motor displacement of the hydraulic propulsion motors 62, 64, 66, 68. For example, the computing system 116 may be communicatively coupled through one or more communicative links with valves and/or actuators configured to adjust respective angles of the pump swash plate 98 and/or the motor swash plates 100. Adjusting the angle(s) of the swash plate(s) 98, 100 may provide adjustment of the pump displacement and/or motor displacement, thereby adjusting a transmission ratio of the drive system 26. Additionally or alternatively, the computing system 116 may actuate the valves 96 operably coupled with each line within the routing assembly 60 to allow or restrict flow through respective first lines 104 and second lines 106 operably coupled with each respective propulsion motor 62, 64, 66, 68. The computing system 116 may be configured to receive signals from the various sensors 114 described herein and determine a pump swash plate position and/or a motor swash plates position based on the data provided by the sensors 114 and/or any other data.

With further reference to FIG. 4, in operation, due to the torque requirements at low speed, the propulsion motors 62, 64, 66, 68 may be generally oversized and, therefore, may run at a very low displacement at high chassis speeds, which can lead to poor efficiency. As such, in some instances, once a chassis speed is above a defined ground speed, the computing system 116 may be configured to assign each of the one or more propulsion motors 62, 64, 66, 68 to a first set or a second set. The assignment may be for a defined period of time based on various assignment parameters, such as assignment based on brake response times, temperatures of various components of the drive system 26, intermittent usage, which may be based on predefined patterns, and/or hydraulic fluid temperatures. It will be appreciated that each of the propulsion motors 62, 64, 66, 68 may be assigned to the first set or the second set independently or in combination with any other propulsion motor 62, 64, 66, 68. Moreover, while the drive system 26 is described herein as having a first set and a second set of propulsion motors 62, 64, 66, 68, it will be appreciated that any number of assignment sets may be defined by the computing system 116 and the assignment parameters without departing from the scope of the present disclosure.

In operation, the first flow rate and the second flow rate may be a common flow rate when the chassis 12 is operated without the detection of one or more defined operational conditions. Once the one or more defined operational conditions is detected, each of the propulsion motors 62, 64, 66, 68 is assigned to the first set or the second set.

In some examples, the vehicle 10 may include a user interface 38 (FIG. 1) that allows the user to interface with the vehicle's computing system through one or more user input devices 42 (e.g., levers, pedals, control panels, buttons, and/or the like). The one or more user input devices 42 may be used to alter an operational condition of the vehicle leading to each of the propulsion motors 62, 64, 66, 68 is assigned to the first set or the second set.

In instances in which the operational conditions include the speed of the chassis 12 exceeding a defined ground speed, the defined ground speed may be determined based on data provided by the sensor. In turn, each of the propulsion motors 62, 64, 66, 68 is assigned to the first set or the second set.

Additionally or alternatively, in instances in which the operational conditions include the frequency at which the traction control system is engaged, the computing system 116 may be configured to log the frequency at which a traction control system is engaged and assign each of the propulsion motors 62, 64, 66, 68 to the first set or the second set when the frequency is below a certain threshold. For example, if traction control system has not been needed for a first defined amount of time (e.g., 5 minutes), each of the propulsion motors 62, 64, 66, 68 is assigned to the first set or the second set. If the traction control system is then needed one or more times within a second defined amount of time (more than once per 5 minutes), each of the propulsion motors 62, 64, 66, 68 may be powered by the computing system 116.

Additionally or alternatively, in instances in which the operational conditions include one or more operational parameters of the vehicle 10 is within a defined range, the computing system 116 may detect the event and assign each of the propulsion motors 62, 64, 66, 68 to the first set or the second set. For example, when an engine power is below a defined percentage (e.g., 70 percent) and a chassis speed is above a defined speed (e.g., 12 kilometers per hour (kph)), the computing system 116 can assign each of the propulsion motors 62, 64, 66, 68 to the first set or the second set. In instances in which one or more of the defined operational parameters is no longer within the defined range, each of the propulsion motors 62, 64, 66, 68 may be powered by the computing system 116.

Additionally or alternatively, in instances in which the operational conditions include detecting a wheel slip event, the computing system 116 may be configured to assign or not assign each of the propulsion motors 62, 64, 66, 68 to the first set or the second set based on the wheel slip event. For example, the computing system 116 may operate the vehicle 10 with each of the propulsion motors 62, 64, 66, 68 assigned to the first set or the second set until a driven wheel within the first set (or within the second set) slips, which may be measured against non-driven wheel speeds or by ground speed radar or some other method. Once the slip event is detected, each of the propulsion motors 62, 64, 66, 68 may be powered by the computing system 116. Additionally or alternatively, the computing system 116 may detect a wheel slip event by measuring a ground speed versus a tangential tire speed being below a first threshold percentage (e.g., 5%). In such instances, the computing system 116 can assign each of the propulsion motors 62, 64, 66, 68 to the first set or the second set. If the computing system 116 detects that a ground speed versus a tangential tire speed is above a second defined percentage (e.g., 8%), each of the propulsion motors 62, 64, 66, 68 may be powered by the computing system 116.

In turn, the computing system 116 can be configured to control a flow rate of the first set to operate at a first flow rate and a second set to operate at a second flow rate. In such instances, the first set of one or more propulsion motors 62, 64, 66, 68 operates at a first lower flow rate and/or a first lower pressure relative to the second set, and the second set of one or more propulsion motors 62, 64, 66, 68 remains at a higher flow rate and/or a higher pressure relative to the first set as driving all four wheels may not be needed for traction since the available torque at each wheel is far below the traction available due to power limitations from the engine. For example, the first flow rate can be set to equal to zero, essentially idling them, while the remaining two propulsion motors 62, 64, 66, 68 work at a higher flow rate and/or a higher pressure, which may increase the overall system efficiency. In some implementations, the efficiency may be increased by up to ten percent, or more.

In other examples, the computing system 116 may control the first set to operate at a first flow rate that is greater than zero and less than the second flow rate when the one or more defined operational conditions are detected. In various examples, the first flow rate may be altered through any practicable manner, such as through the actuation of the valves 96 associated with each hydraulic line from the first position to the second position, the alteration of a swash plate position, and/or through any other manner.

In some examples, the computing system 116 may reduce the flow rate and/or pressure of the hydraulic fluid to a first set of one or more propulsion motors 62, 64, 66, 68 relative to a second set of propulsion motors 62, 64, 66, 68 based on whichever propulsion motors 62, 64, 66, 68 can provide a quicker brake response to the wheels. For example, a transition from an idle state to a negative torque state is faster than a positive torque state to a negative torque state, which would lead to the first set of one or more propulsion motors 62, 64, 66, 68 being associated with the wheels to be idled, while the second set of one or more propulsion motors 62, 64, 66, 68 is associated with the wheels.

Additionally or alternatively, the computing system 116 may periodically change the one or more propulsion motors 62, 64, 66, 68 associated with the first set and the one or more propulsion motors 62, 64, 66, 68 associated with the second set based on one or more operational conditions. For example, the operational condition can include a hydraulic fluid temperature to prevent overheating of the hydraulic fluid. For example, the computing system 116 can be configured to assign the first propulsion motor 62 and the fourth propulsion motor 68 to the first set and the second propulsion motor 64 and the third propulsion motor 66 to the second set during a first time period and the second propulsion motor 64 and the third propulsion motor 66 to the first set and the first propulsion motor 62 and the fourth propulsion motor 68 to the second set during a second time period, the second time period after the first time period. In some instances, a duration of the first time period is varied from a duration of the second time period. Alternatively, a duration of the first time period is common with a duration of the second time period.

Based on the duration of a defined time period, a determined temperature, and/or any other factor, the computing system 116 may determine that a temperature of the hydraulic fluid is increasing. In turn, the computing system 116 may control a flow rate of the first set to operate at a first flow rate and the second set to operate at a second flow rate.

Additionally or alternatively, the computing system 116 may be configured to pair the front right wheel with the rear left wheel together in the first set to operate at a first lower flow rate and/or a first lower pressure relative to the second set and the left wheel and the rear right wheel in the second set to operate at a higher, second flow rate and/or a second flow rate relative to the first set. Based on a defined time, a determined temperature, and/or any other factor, the computing system 116 may then place the left wheel and the rear right wheel in the first set to operate at a first lower flow rate and/or a first lower pressure relative to the second set and the front right wheel with the rear left wheel in the second set to operate at a higher, second flow rate and/or a second flow rate relative to the first set.

In various examples, the first lower flow rate and/or a first lower pressure may be zero such that any of the one or more propulsion motors 62, 64, 66, 68 within the first set may be generally idled. Alternatively, the first lower flow rate and/or a first lower pressure may be greater than zero and less than the second, higher flow and/or the second, higher such that most of the tractive power of the vehicle 10 is provided by the one or more propulsion motors 62, 64, 66, 68 within the second set. By varying the amount of power between the first set and the second set, the efficiency of the vehicle 10 may be improved while also maintaining and/or improving the stability and/or a response time of the vehicle 10 when compared to situations when one or more propulsion motors 62, 64, 66, 68 is placed in an idled state.

In some embodiments, the computing system 116 may also be configured to prevent overheating of the hydraulic fluid during braking. For example, the computing system 116 may calculate a composite scaling factor based, at least in part, on the hydraulic fluid temperature. The composite scaling factor may be reduced when the hydraulic fluid temperature exceeds a predetermined temperature threshold. In response, the computing system 116 may adjust the operation of the system 26 to prevent overheating of the hydraulic fluid. In some embodiments, the computing system 116 may also be configured to regulate engine braking of the drive system 26 to protect the power plant 28 from damage as a result of over-speeding.

In some embodiments, the computing system 116 may be configured to cool the hydraulic fluid by allowing power through a flow of hydraulic fluid out of the closed hydraulic loop 102, cooling the hydraulic fluid, and then pumping the hydraulic fluid back into the closed hydraulic loop 102. For example, the charge pump 108 may replenish the closed hydraulic loop 102 with hydraulic fluid at a relatively cooler temperature.

Figure 5:
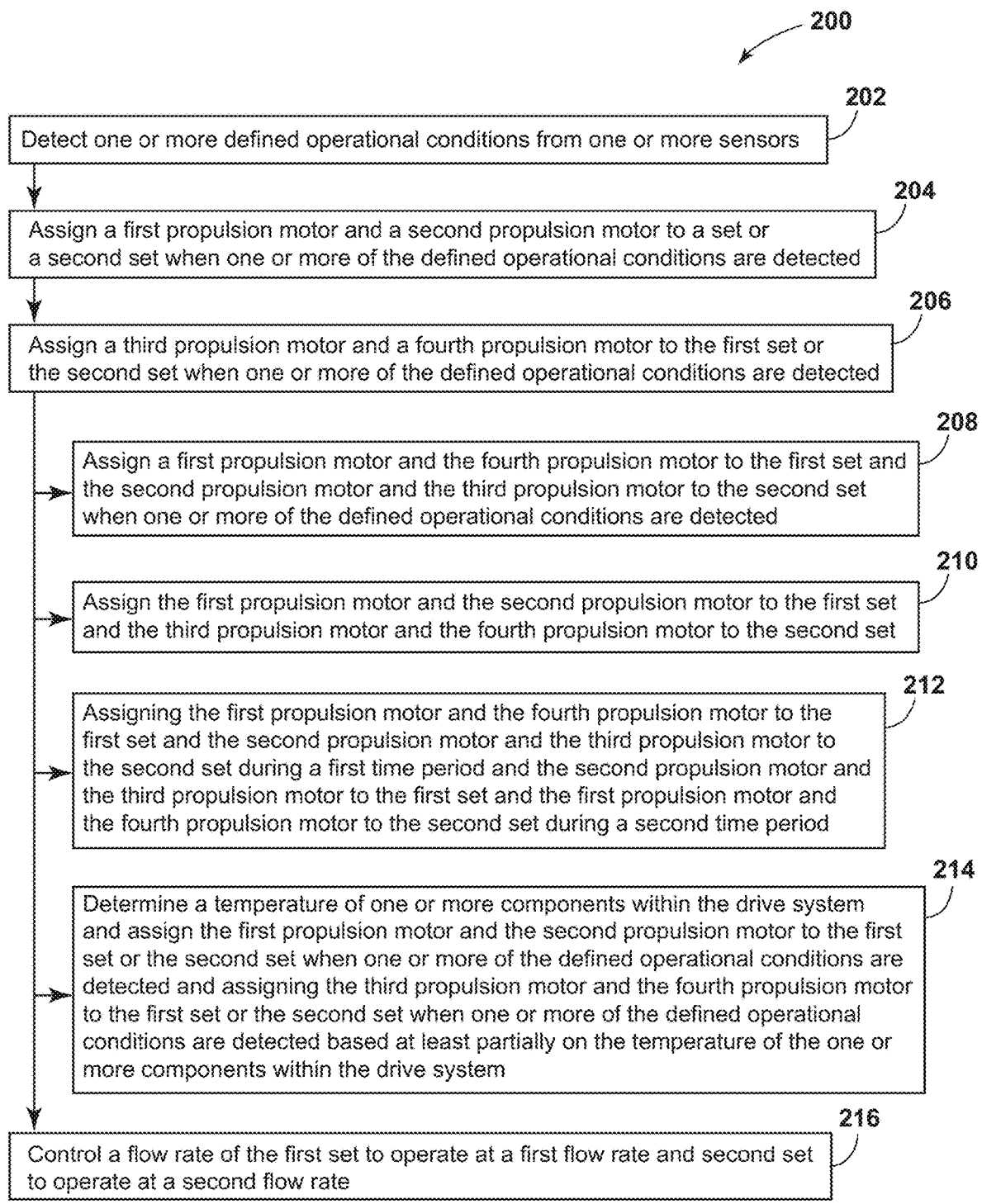
FIG. 5 illustrates a flow diagram of a method for operating an agricultural drive system in accordance with aspects of the present subject matter.

Referring now to FIG. 5, a method 200 of operating a drive system of an agricultural vehicle is illustrated in accordance with aspects of the present subject matter. In general, the method 200 will be described herein with reference to the vehicle 10 described above with reference to FIGS. 1-4. However, the disclosed method 200 may generally be utilized with any suitable harvesting assembly. In addition, although FIG. 5 depicts steps performed in a particular order for purposes of illustration and discussion, the methods discussed herein are not limited to any particular order or arrangement. One skilled in the art, using the disclosure provided herein, will appreciate that various steps of the methods disclosed herein can be omitted, rearranged, combined, and/or adapted in various ways without deviating from the scope of the present disclosure.

As shown in FIG. 5, at (202), the method 200 can include detecting one or more defined operational conditions from one or more sensors. As provided herein, the vehicle includes a chassis driven by a propulsion pump unit with a computing system.

At (204), the method can include assigning a first propulsion motor and a second propulsion motor to a first set or a second set when the one or more defined operational conditions are detected. Similarly, at (206), the method can include assigning a third propulsion motor and a fourth propulsion motor to the first set or the second set when the one or more defined operational conditions are detected. As provided herein, the first propulsion motor can be fluidly coupled with the propulsion pump unit and can be configured to drive a first tractive force to a first wheel assembly, the first wheel assembly positioned fore of a latitudinal centerline of the chassis, wherein the second propulsion motor can be fluidly coupled with the propulsion pump unit and can be configured to drive a second tractive force to a second wheel assembly, the second wheel assembly positioned aft of a latitudinal centerline of the chassis, wherein the third propulsion motor can be fluidly coupled with the propulsion pump unit and can be configured to drive a third tractive force to a third wheel assembly, the third wheel assembly positioned aft of a latitudinal centerline of the chassis and on a common side of a longitudinal centerline of the chassis as the first wheel assembly, and wherein the fourth propulsion motor can be fluidly coupled with the propulsion pump unit and can be configured to drive a fourth tractive force to a fourth wheel assembly, the fourth wheel assembly positioned fore of a latitudinal centerline of the chassis and on a common side of a longitudinal centerline of the chassis as the second wheel assembly.

At (208), the method can include assigning the first propulsion motor and the fourth propulsion motor to the first set and the second propulsion motor, and the third propulsion motor to the second set when the one or more defined operational conditions are detected. Additionally or alternatively, at (210), the method 200 can include assigning the first propulsion motor and the second propulsion motor to the first set and the third propulsion motor and the fourth propulsion motor to the second set. Additionally or alternatively, at (212), the method 200 can include assigning the first propulsion motor and the fourth propulsion motor to the first set and the second propulsion motor and the third propulsion motor to the second set during a first time period, and the second propulsion motor and the third propulsion motor to the first set and the first propulsion motor and the fourth propulsion motor to the second set during a second time period. Additionally or alternative, at (214), the method 200 can include determining a temperature of one or more components within the drive system and assigning the first propulsion motor and the second propulsion motor to the first set or the second set when the one or more defined operational conditions are detected and assigning the third propulsion motor and the fourth propulsion motor to the first set or the second set when the one or more defined operational conditions are detected based at least partially on the temperature of the one or more components within the drive system.

At (216), the method 200 can include controlling a flow rate of the first set to operate at a first flow rate and the second set to operate at a second flow rate. In some cases, the first pressure is less than the second flow rate. As provided herein, the first flow rate can be set to equal to zero, essentially idling them, while the remaining two propulsion motors work at a higher flow rate and/or a higher pressure, which may increase the overall system efficiency. In other examples, the computing system may control the first set to operate at a first flow rate that is greater than zero and less than the second flow rate when the one or more defined operational conditions are detected.

In various examples, the method 200 may implement machine learning methods and algorithms that utilize one or several machine learning techniques including, for example, decision tree learning, including, for example, random forest or conditional inference trees methods, neural networks, support vector vehicles, clustering, and Bayesian networks. These algorithms can include computer-executable code that can be retrieved by the computing system and/or through a network/cloud and may be used to evaluate and update the boom deflection model. In some instances, the machine learning engine may allow for changes to the boom deflection model to be performed without human intervention.

It is to be understood that the steps of any method disclosed herein may be performed by a computing system upon loading and executing software code or instructions that are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions that are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A drive system for an agricultural vehicle, the drive system comprising:
    a chassis;
    a power plant operably coupled with the chassis;
    a propulsion pump unit connected to the power plant and configured to generate power through a flow of hydraulic fluid;
    a first propulsion motor fluidly coupled with the propulsion pump unit and configured to drive a first tractive force to a first wheel assembly, the first wheel assembly positioned fore of a latitudinal centerline of the chassis;
    a second propulsion motor fluidly coupled with the propulsion pump unit and configured to drive a second tractive force to a second wheel assembly, the second wheel assembly positioned aft of the latitudinal centerline of the chassis;
    a sensor configured to detect data indicative of one or more defined operational conditions; and
    a computing system operably coupled with the sensor, the first propulsion motor, and the second propulsion motor, the computing system including a processor and associated memory, the memory storing instructions that, when implemented by the processor, configure the computing system to:
        detect the one or more defined operational conditions based on the data from the sensor;
        assign the first propulsion motor and the second propulsion motor to a first set or a second set when the one or more defined operational conditions are detected; and
        control a flow rate of the first set to operate at a first flow rate and the second set to operate at a second flow rate, the first flow rate less than the second flow rate.

2. The drive system of claim 1, further comprising:
    a third propulsion motor fluidly coupled with the propulsion pump unit and configured to drive a third tractive force to a third wheel assembly, the third wheel assembly positioned aft of the latitudinal centerline of the chassis and on a common side of a longitudinal centerline of the chassis as the first wheel assembly; and
    a fourth propulsion motor fluidly coupled with the propulsion pump unit and configured to drive a fourth tractive force to a fourth wheel assembly, the fourth wheel assembly positioned fore of the latitudinal centerline of the chassis and on a common side of the longitudinal centerline of the chassis as the second wheel assembly.

3. The drive system of claim 2, wherein the computing system is further configured to:
    assign the third propulsion motor and the fourth propulsion motor to the first set or the second set when the one or more defined operational conditions are detected.

4. The drive system of claim 3, wherein the computing system is configured to assign the first propulsion motor and the fourth propulsion motor to the first set and the second propulsion motor and the third propulsion motor to the second set when one or more of the one or more defined operational conditions are detected.

5. The drive system of claim 3, wherein the computing system is configured to assign the first propulsion motor and the fourth propulsion motor to the first set and the second propulsion motor and the third propulsion motor to the second set during a first time period and the second propulsion motor and the third propulsion motor to the first set and the first propulsion motor and the fourth propulsion motor to the second set during a second time period, the second time period after the first time period.

6. The drive system of claim 5, wherein a duration of the first time period is varied from a duration of the second time period.

7. The drive system of claim 5, wherein a duration of the first time period is common with a duration of the second time period.

8. The drive system of claim 3, wherein the computing system is configured to assign the first propulsion motor and the second propulsion motor to the first set and the third propulsion motor and the fourth propulsion motor to the second set.

9. The drive system of claim 1, wherein the first flow rate and the second flow rate are at a common flow rate when the chassis is operated below a defined speed of the chassis.

10. The drive system of claim 1, wherein the first flow rate is equal to zero when the one or more defined operational conditions are detected.

11. The drive system of claim 1, wherein the first flow rate is greater than zero and less than the second flow rate when the one or more defined operational conditions are detected.

12. The drive system of claim 1, wherein the one or more defined operational conditions includes at least one of a user input device directing a change in operation of the vehicle, a speed of the chassis exceeding a defined ground speed, a traction control system engagement frequency exceeding a frequency threshold, one or more operational parameters being within a defined range, or detecting a wheel slip event.

13. A method for operating a drive system of an agricultural vehicle, the method comprising:
    detecting, with a computing system, one or more defined operational conditions from one or more sensors of a vehicle including a chassis driven by a propulsion pump unit;
    assigning a first propulsion motor and a second propulsion motor to a first set or a second set when the one or more defined operational conditions are detected; and
    controlling a flow rate of the first set to operate at a first flow rate and the second set to operate at a second flow rate, the first flow rate less than the second flow rate.

14. The method of claim 13, further comprising:
    assigning a third propulsion motor and a fourth propulsion motor to the first set or the second set when the one or more defined operational conditions are detected.

15. The method of claim 14, wherein the first propulsion motor is fluidly coupled with the propulsion pump unit and is configured to drive a first tractive force to a first wheel assembly, the first wheel assembly positioned fore of a latitudinal centerline of the chassis, wherein the second propulsion motor is fluidly coupled with the propulsion pump unit and is configured to drive a second tractive force to a second wheel assembly, the second wheel assembly positioned aft of the latitudinal centerline of the chassis, wherein the third propulsion motor is fluidly coupled with the propulsion pump unit and is configured to drive a third tractive force to a third wheel assembly, the third wheel assembly positioned aft of the latitudinal centerline of the chassis and on a common side of a longitudinal centerline of the chassis as the first wheel assembly, and wherein the fourth propulsion motor is fluidly coupled with the propulsion pump unit and is configured to drive a fourth tractive force to a fourth wheel assembly, the fourth wheel assembly positioned fore of the latitudinal centerline of the chassis and on a common side of the longitudinal centerline of the chassis as the second wheel assembly.

16. The method of claim 14, wherein assigning the first propulsion motor and the second propulsion motor to the first set or the second set when the one or more defined operational conditions are detected and assigning the third propulsion motor and the fourth propulsion motor to the first set or the second set when the one or more defined operational conditions are detected further comprises:
    assigning the first propulsion motor and the fourth propulsion motor to the first set and the second propulsion motor and the third propulsion motor to the second set when the one or more defined operational conditions are detected.

17. The method of claim 14, wherein assigning the first propulsion motor and the second propulsion motor to the first set or the second set when the one or more defined operational conditions are detected and assigning the third propulsion motor and the fourth propulsion motor to the first set or the second set when the one or more defined operational conditions are detected further comprises:
    assigning the first propulsion motor and the second propulsion motor to the first set and the third propulsion motor and the fourth propulsion motor to the second set.

18. The method of claim 14, wherein assigning the first propulsion motor and the second propulsion motor to the first set or the second set when the one or more defined operational conditions are detected and assigning the third propulsion motor and the fourth propulsion motor to the first set or the second set when the one or more defined operational conditions are detected further comprises:
    assigning the first propulsion motor and the fourth propulsion motor to the first set and the second propulsion motor and the third propulsion motor to the second set during a first time period and the second propulsion motor and the third propulsion motor to the first set and the first propulsion motor and the fourth propulsion motor to the second set during a second time period, the second time period after the first time period.

19. The method of claim 14, further comprising:
    determining a temperature of one or more components within the drive system,
    wherein assigning the first propulsion motor and the second propulsion motor to the first set or the second set when the one or more defined operational conditions are detected and assigning the third propulsion motor and the fourth propulsion motor to the first set or the second set when a speed of the chassis is based at least partially on the temperature of the one or more components within the drive system.

20. A drive system for an agricultural vehicle, the drive system comprising:
    a chassis;
    a power plant operably coupled with the chassis;
    a propulsion pump unit connected to the power plant and configured to generate power through a flow of hydraulic fluid;
    a first propulsion motor fluidly coupled with the propulsion pump unit and configured to drive a first tractive force to a first wheel assembly, the first wheel assembly positioned fore of a latitudinal centerline of the chassis;
    a second propulsion motor fluidly coupled with the propulsion pump unit and configured to drive a second tractive force to a second wheel assembly, the second wheel assembly positioned aft of the latitudinal centerline of the chassis;
    a third propulsion motor fluidly coupled with the propulsion pump unit and configured to drive a third tractive force to a third wheel assembly, the third wheel assembly positioned aft of the latitudinal centerline of the chassis and on a common side of a longitudinal centerline of the chassis as the first wheel assembly;
    a fourth propulsion motor fluidly coupled with the propulsion pump unit and configured to drive a fourth tractive force to a fourth wheel assembly, the fourth wheel assembly positioned fore of the latitudinal centerline of the chassis and on a common side of the longitudinal centerline of the chassis as the second wheel assembly;
a sensor configured to provide data indicative of one or more operational conditions; and
a computing system operably coupled with the sensor, the first propulsion motor, the second propulsion motor, the third propulsion motor, and the fourth propulsion motor, the computing system including a processor and associated memory, the memory storing instructions that, when implemented by the processor, configure the computing system to:
  detect the one or more operational conditions based on the data from the sensor;
  assign the first propulsion motor, the second propulsion motor, the third propulsion motor, and the fourth propulsion motor to a first set or a second set when the one or more defined operational conditions are detected based on one or more assignment parameters; and
control a flow rate of the first set to operate at a first flow rate and the second set to operate at a second flow rate, the first flow rate less than the second flow rate.

* * * * *